United States Patent [19]

Hirt

[11] Patent Number: 4,698,087

[45] Date of Patent: Oct. 6, 1987

[54] TAKE-OUT MECHANISM FOR A GLASSWARE FORMING MACHINE

[75] Inventor: Walter Hirt, Buelach, Switzerland

[73] Assignee: Emhart Industries, Inc., Farmington, Conn.

[21] Appl. No.: 910,047

[22] Filed: Sep. 19, 1986

[30] Foreign Application Priority Data

Sep. 21, 1985 [GB] United Kingdom ............... 8523370

[51] Int. Cl.⁴ .............................................. C03B 9/44
[52] U.S. Cl. ........................................ 65/172; 65/173; 65/239; 65/260
[58] Field of Search ............... 65/171, 172, 173, 233, 65/234, 239, 242, 260, 307

[56] References Cited

U.S. PATENT DOCUMENTS 4,529,432  7/1985  Nebelung et al. ............... 65/239 X

FOREIGN PATENT DOCUMENTS

WO84/03495  9/1984  PCT Int'l Appl. ............... 65/233

Primary Examiner—Arthur Kellogg
Attorney, Agent, or Firm—Spencer T. Smith

[57] ABSTRACT

A take-out mechanism for removing articles of glassware from a glassware forming machine comprises an arm turnable about a horizontal axis, a support (10) mounted on the arm, orientating means to maintain the orientation of the support as the arm turns, a tong carrier (14) and securing means securing the tong carrier to the support. The securing means comprising mating portions (10b,14b) having mating surfaces (10c,14c) and at least one projection (18) arranged to enter a recess (20) so that the surfaces can only mate in a particular desired orientation, and a screw (22) captive in the carrier and arranged to enter a threaded recess (24) in the support.

4 Claims, 2 Drawing Figures

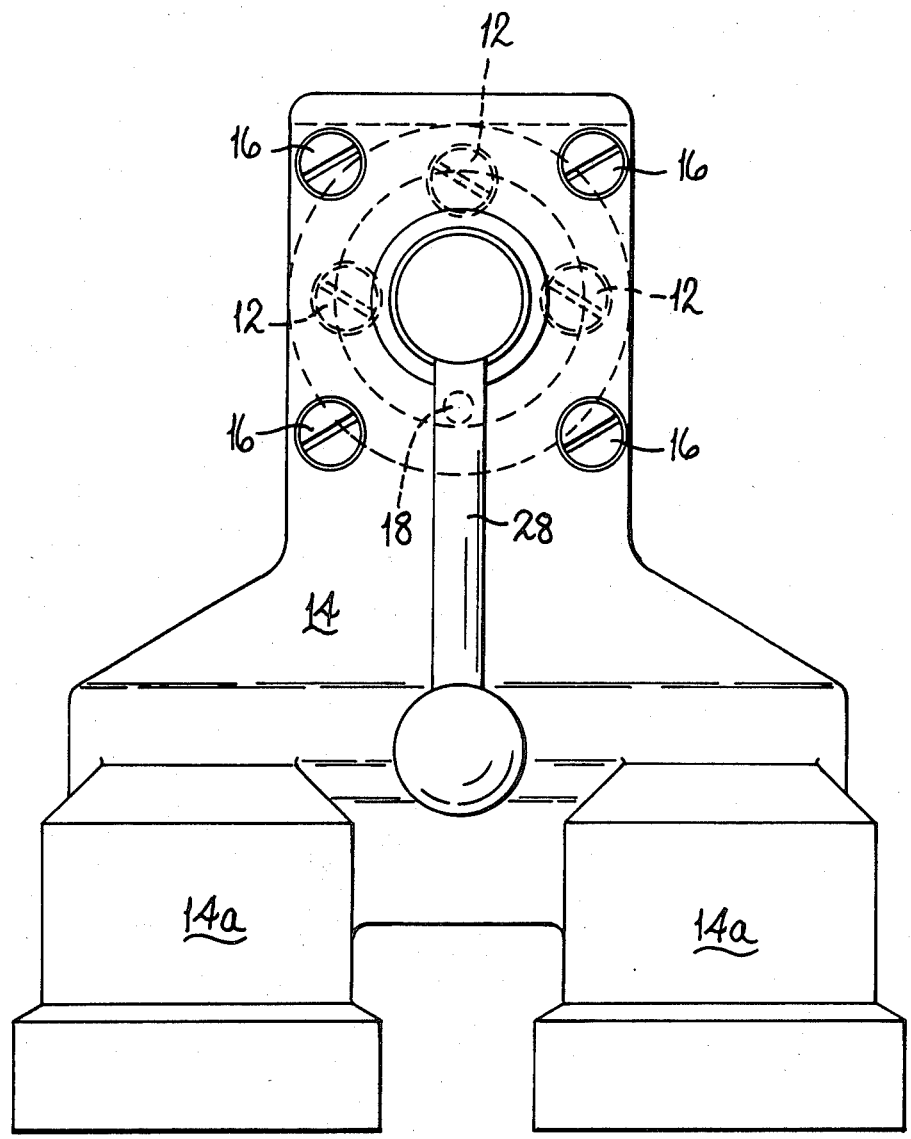
Fig_1

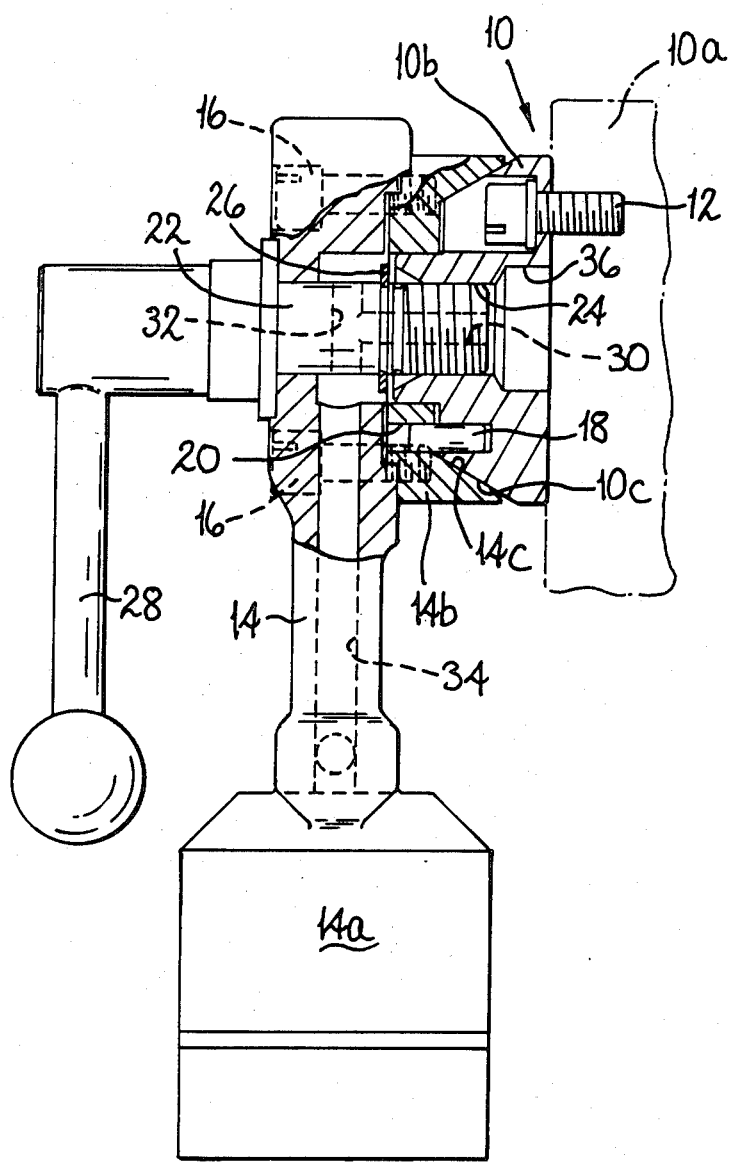
Fig_2

TAKE-OUT MECHANISM FOR A GLASSWARE FORMING MACHINE

BACKGROUND OF THE INVENTION

This invention is concerned with a take-out mechanism for a glassware forming machine.

In glassware forming machines of the individual section type, take-out mechanisms are used for removing newly-moulded articles of glassware from moulds of the machine and to position them on a support, known as a deadplate, for subsequent removal from the machine. A typical take-out mechanism comprises an arm mounted to turn on a horizontal axis, a support for a tong carrier mounted on the arm, orientation means operable to maintain the orientation of the support constant as the arm is turned about the horizontal axis between a loading position and an unloading position, a tong carrier mounted on the support and carrying tongs operable to grip articles of glassware when the arm is in the loading position and to release the articles when the arm is in the unloading position, and securing means securing the tong carrier to the support.

In a typical take-out mechanism, the arm is turned back and forth through approximately 180° between the loading and unloading positions by the action of a rack and pinion arrangement driven by a piston and cylinder assembly. The support is mounted on the arm to turn relative to the arm on a horizontal axis and has a pinion portion. The orientation means comprises means, such as a pinion or a chain, connecting the pinion portion of the support to a fixed gear centred on the axis on which the arm turns so that the support maintains a constant orientation as the arm is turned back and forth. The constant orientation is necessary to maintain articles carried by the tong carrier in an upright condition.

The tong carrier of a typical take-out mechanism carries a pair of tongs operable to grip or release an article of glassware upon operation of a piston and cylinder assembly mounted on the carrier and operable by air under pressure supplied to the carrier through the support and the arm. Where more than one article of glassware is being formed simultaneously, the carrier carries a like number of pairs of tongs.

In a typical take-out mechanism, the carrier is secured to the support by releasable securing means so that the carrier can be removed for replacement. The securing means secures the carrier to the support on either a horizontal or vertical interface and comprises three bolts and a locating pin cooperating with a recess to ensure that the orientation of the carrier on the support is correct. This type of securing means is, however, inconvenient and replacement of a carrier is time-consuming, frequently occupying 5 to 10 minutes with consequent production losses while the replacement takes place and while the moulds of the machine return to working temperature. Since a machine of the individual section type may have six, eight or ten sections each with a take-out mechanism, the time spent on carrier replacement is considerable.

It is an object of the present invention to provide an improved take-out mechanism having securing means which can be operated more rapidly than in existing take-out mechanisms.

BRIEF SUMMARY OF THE INVENTION

The invention provides a take-out mechanism for use in a glassware forming machine for removing completed articles from a mould or moulds of the machine, the mechanism comprising an arm, a support for a tong carrier mounted on the arm, orientating means operable to maintain the orientation of the support constant as the arm is turned about a horizontal axis between a loading position and an unloading position, a tong carrier mounted on the support and carrying tongs operable to grip articles of glassware when the arm is in the loading position and to release the articles when the arm is in the unloading position, and securing means securing the tong carrier to the support, wherein the securing means comprises first and second mating portions, one formed on the support and the other on the tong carrier, the mating portions having mating surfaces and at least one projection projecting from one portion and arranged to enter a recess in the other portion so that the mating surfaces can only mate in a particular desired orientation, and a screw captive in the tong carrier and arranged to enter a threaded recess in the support to secure the carrier to the support.

A take-out mechanism according to the last preceding paragraph has securing means which is rapid to operate. All that is required is to bring the mating surfaces into engagement with the projection in the recess and tighten the captive screw. This can generally be achieved in less than one minute and by one workman instead of the two required with a typical take-out mechanism as referred to above.

Preferably, the mating surfaces are frusto-conical as this assists in bringing the mating surfaces into engagement.

Conveniently, the captive screw contains an air passage through which tong-operating air can enter the carrier from the arm.

BRIEF DESCRIPTION OF THE DRAWINGS

There now follows a detailed description, to be read with reference to the accompanying drawings, of a take-out mechanism which is illustrative of the invention. It is to be understood that the illustrative take-out mechanism has been selected for description by way of example and not of limitation of the invention.

In the drawings:

FIG. 1 is a front elevational view of the tong carrier of the illustrative take-out mechanism; and FIG. 2 is a side elevational view, partly in section of the carrier shown in FIG. 1.

DETAILED DESCRIPTION OF PREFERRED EMBODIMENT OF THE INVENTION

The illustrative take-out mechanism is for use in a glassware forming machine of the individual section type for removing articles from a mould or moulds of the machine. The mechanism comprises an arm (not shown) of conventional construction which is mounted to be turned about a horizontal axis between a loading position and an unloading position thereof.

The illustrative take-out mechanism also comprises a support 10 for a tong carrier mounted on the arm. The support 10 is mounted in conventional manner to turn about a horizontal axis on the arm and, for this purpose, has a portion 10a which is mounted on a bearing (not shown) on the arm.

The illustrative take-out mechanism also comprises orientating means (not shown) operable to maintain the orientation of the support 10 constant as the arm is turned about its horizontal axis between its loading and unloading positions. The orientating means acts on the portion 10a to turn it, as the arm turns, by an amount sufficient to maintain the orientation of the carrier. The portion 10a is formed as a pinion which is connected to a pinion fixed on the axis of the arm by a gear which meshes with both pinions but other forms of orientation means may be used. A mating portion 10b of the support 10 is bolted to the portion 10a by three bolts 12.

The first illustrative take-out mechanism also comprises a tong carrier 14 mounted on the support 10 and carrying tongs (not shown) of conventional construction which are operable to grip articles of glassware when the arm is in the loading position and to release the articles when the arm is in the unloading position. The carrier 14 is arranged to carry two pairs of tongs which, in conventional manner, are mounted on piston and cylinder assemblies which plug into recesses formed in cylindrical lower portions 14a of the carrier 14. A mating portion 14b is bolted to the remainder of the carrier 14 by four bolts 16.

The first illustrative take-out mechanism also comprises securing means securing the carrier 14 to the support 10. The securing means comprises the mating portion 10b and the mating portion 14b. The portions 10b and 14b have mating surfaces 10c and 14c which are frusto-conical about the horizontal axis about which the support 10 turns on the arm, the surface 14c being female and arranged to fit over the surface 10c. Portion 10b also supports an outwardly projecting projection in the form of a pin 18 which will enter a recess 20 in the portion 14b. The projection 18 and recess 20 serve to ensure that the mating surfaces 10c and 14c can only mate in a particular desired orientation in which the carrier 14 is correctly positioned on the support 10.

The securing means of the first illustrative take-out mechanism also comprises a screw 22 captive in the tong carrier 14 and arranged to enter a threaded recess 24 in the support 10 to secure the carrier to the support. The screw 22 is held in the carrier 14 by a circlip 26 and can be turned by means of a handle 28. The end of the screw 22 which enters the recess 24 has a longitudinal air passage 30 therein which communicates with a transverse air passage 32 in the screw 22 which in turn communicates with a vertical air passage 34 in the carrier 14 which leads to the portions 14a and is arranged to carry operating air to tong-operating piston and cylinder assemblies. The captive screw 22, thus, contains an air passage 30,32 through which tong-operating air can enter the carrier 14 from the support 10. The air enters the passage 30 through a passage 36 in the portion 10b which communicates with a conventional air passage in the support 10.

In order to replace the carrier 14, it is only necessary to loosen the screw 22, remove the old carrier 14, present a new carrier 14 so that the surfaces 10c and 14c mate, and tighten the screw 22 again.

The invention has the further advantage that, when tongs are to be replaced, the replacement tongs can be mounted on a carrier 14 away from the machine and then the carrier can be rapidly exchanged for the one on the machine.

The portions 10b and 14b can be made of wear-resistant material.

I claim:

1. A glassware forming machine comprising:
   support means having a threaded bore therein,
   tong carrier means including an upper portion to be secured to said support means,
   a through bore defined in said upper portion having a first portion and an axially adjacent enlarged portion defining a flange portion therebetween,
   fastening means having
     a threaded portion at one end for threaded insertion into said support means threaded bore,
     rotatable means at the other end adapted to be rotated to threadedly insert said threaded portion into said threaded bore,
     a cylindrical portion intermediate said threaded portion and said rotatable means for sliding displacement within said first through bore portion,
     a first enlarged portion between said threaded and cylindrical portions for engaging said flange portion thereby limiting the displacement of said cylindrical portion relative to said first through bore portion in one direction,
     a second enlarged portion at the other end of said cylindrical portion for engaging said tong carrier upper portion thereby limiting the displacement of said cylindrical portion in the opposite direction relative to said through bore portion, and
     said cylindrical portion having a length selected so that when said rotatable means is rotated to insert said threaded portion into said threaded bore, said tong carrier will be secured to said support means.

2. A glassware forming machine according to claim 1, wherein said support means and said tong carrier means further comprise mating conical surface means.

3. A glassware forming machine according to claim 2, wherein said support means and said tong carrier means further comprise means for preventing securement of said tong carrier means to said support means at any relative orientation other than the desired orientation.

4. A glassware forming machine according to claim 3, wherein said rotatable means includes a handle.

* * * * *